United States Patent [19]

Kaufman et al.

[11] Patent Number: 5,173,854
[45] Date of Patent: Dec. 22, 1992

[54] DISTRIBUTED TEXT EDITING SYSTEM WITH REMOTE TERMINAL TRANSMITS SUCCESSIVE AUDIT MESSAGES EACH IDENTIFYING INDIVIDUAL EDITING OPERATION

[75] Inventors: Bruce L. Kaufman; Gerald L. Lozano, both of Austin, Tex.

[73] Assignee: Tandem Computers Incorporated, Cupertino, Calif.

[21] Appl. No.: 758,227

[22] Filed: Sep. 9, 1991

Related U.S. Application Data

[63] Continuation of Ser. No. 619,173, Jun. 11, 1984, abandoned.

[51] Int. Cl.[5] .................... G06F 3/00; G06F 15/00
[52] U.S. Cl. ................... 364/419; 395/800; 364/DIG. 2; 364/943; 364/943.43; 364/943.1
[58] Field of Search ................. 364/419; 395/800

[56] References Cited

U.S. PATENT DOCUMENTS

| | | | |
|---|---|---|---|
| 3,810,107 | 5/1974 | Goldman et al. | 364/200 |
| 3,980,994 | 9/1976 | Ying et al. | 364/200 |
| 4,016,542 | 4/1977 | Azure | 364/900 |
| 4,110,823 | 8/1978 | Cronshaw et al. | 364/200 |
| 4,195,353 | 3/1980 | Abe et al. | 364/900 |
| 4,228,422 | 10/1980 | Perry | 340/310 A |
| 4,386,416 | 5/1983 | Giltner et al. | 364/900 |
| 4,387,424 | 6/1983 | Frediani et al. | 364/200 |
| 4,435,777 | 3/1984 | McCaskill et al. | 364/200 |
| 4,589,068 | 5/1986 | Heinen, Jr. | 364/300 |
| 4,633,430 | 12/1986 | Cooper | 364/900 |
| 4,641,274 | 2/1987 | Swank | 364/900 |

OTHER PUBLICATIONS

IBM Technical Disclosure Bulletin, vol. 26, No. 3B, Aug. 1983, "Transfer of Documents from a Word Processing Station to Document Library controlled by a Central Data Processor" by G. J. Foster et al., pp. 1412–1413.

*Primary Examiner*—Thomas C. Lee
*Attorney, Agent, or Firm*—Townsend and Townsend

[57] ABSTRACT

A method for processing text in a system including a host computer having a central memory unit for storing text data and a terminal unit having a local memory and a keyboard for receiving operator inputs. The host computer transfers a portion of text data to the terminal unit local memory, the terminal unit generates text editing inputs to alter the data, and the data in the local memory are altered accordingly. The terminal unit assembles audit messages which indicate a fundamental operation requested by the text editing inputs, e.g., insert text, delete text, replace text, etc., and contain the information necessary for the host computer to effect it. The audit meassages are subsequently sent to the host computer so that the host computer may alter the text in the central memory unit according to the fundamental operation indicated by the audit message.

23 Claims, 7 Drawing Sheets

DISTRIBUTED TEXT EDITING SYSTEM WITH REMOTE TERMINAL TRANSMITS SUCCESSIVE AUDIT MESSAGES EACH IDENTIFYING INDIVIDUAL EDITING OPERATION

This is a continuation of application Ser. No. 06/619,173, filed Jun. 11, 1984, now abandoned.

BACKGROUND OF THE INVENTION

This invention relates to distributed processing systems, and in particular, to systems and methods for performing text or word processing in a distributed processing environment.

Early text processing on computers involved a mainframe coupled to a teletype printer terminal. The teletype hardware only allowed information to be transferred from the teletype to the main frame whenever each key was depressed. Text editing was limited to at most a single line by the physical characteristics of such a device.

When cathode ray tube (CRT) technology developed for use with computers, CRT text processors continued to offer only single line editing since they were adapted from the teletype text processors. Later screen editors which utilized block mode terminals allowed processing of changes for an entire screen of text.

A typical full-screen text processor for a CRT terminal coupled to a mainframe processor is very slow because the terminal sends each key stroke to the main frame for processing. Since mainframes support many other tasks, the response time for text processing is usually unacceptably slow.

Dedicated text processing emerged with the advent of minicomputers and personal computers. Dedicated text processors, as their name indicates, provide only text editing and usually only for a single user. These systems provide relatively fast response times, but they have several disadvantages which make them unacceptable for many business applications. Small, dedicated processors typically have very limited storage which limits the size of the files or documents that dedicated processors can accept. Data sharing is also a problem because any such data must be stored on a transportable medium, for example a floppy disc, and it must be stored in a format which is recognizable to the recipient computer. This is a very slow and awkward method of data sharing.

A more significant drawback to most dedicated text processing implemented on a personal computer is that floppy disc storage is prone to error and degradation which cause loss of files and data with potentially disastrous results.

A new trend in the data processing field involves distributed processing, an example of which is shown in FIG. 1. In a distributed data processing system, a host processor 10 communicates with remote terminals 20 via communication lines 30. The terminals in a distributed data processing system have enough processing capability to perform certain operations, the amount of processing capability varying with the system.

A problem encountered in designing distributed processing systems is dividing the labor between the host computer and the distributed terminals to take advantage of the terminals' speed and the host's memory and processing capability.

Accordingly, an object of this invention is to provide text processing in a distributed processing environment which offers fast response time.

Another object of this invention is to provide text processing in a distributed processing environment which maintains high data integrity.

Yet another object of the invention is to provide text processing in a distributed processing environment that uses the host's computer memory capability and processing speed but does not sacrifice response time by subjecting the remote terminals to the unpredictable availability of the host's resources in a time-sharing environment.

A further object of the invention is to provide a distributed processing system and method of operating such a system which efficiently manages communications between the host computer and remote terminals.

SUMMARY OF THE INVENTION

In accordance with the present invention, there is provided a method of operating a text processing system having a host computer including a central memory unit for storing text to be edited, one or more text processing terminals having a keyboard for receiving operator inputs together with a local memory and a display device, such as a cathode ray tube, for displaying formatted text, and data transmission means for transferring data between one of the text processing terminals and the host computer, which method includes the steps of transferring a portion of the text from the host processor's central memory to the terminal and displaying some or all of the text on the display device, generating text editing inputs to alter the text data stored in the local memory, assembling at the terminal, for preselected ones of the text editing inputs, audit messages indicating in compacted form the nature of the preselected inputs and information necessary to effect those inputs, effecting, at the terminal receiving the preselected text editing inputs, the operations requested by the preselected inputs, and transferring the audit messages to the host computer to update the text data stored in the central memory unit by effecting the operations requested by the preselected editing inputs.

The accompanying drawings, which are incorporated in and which constitute a part of this specification, illustrate an embodiment of the invention and together with the description explain the principles of the invention.

DESCRIPTION OF THE PREFERRED EMBODIMENTS

Figure 1:
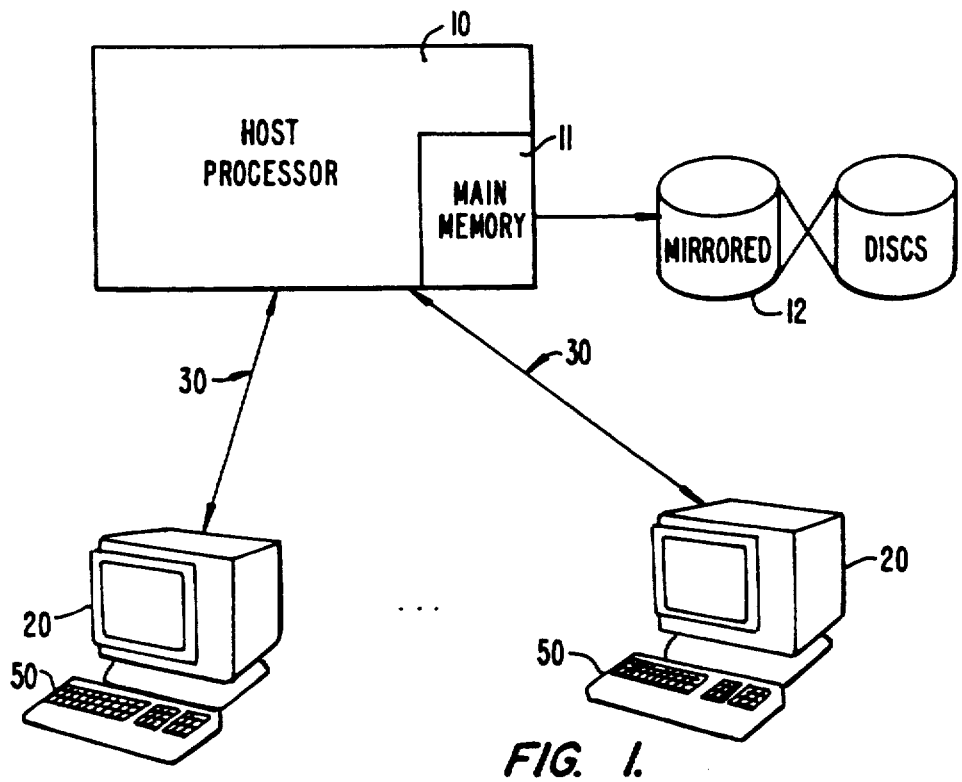
FIG. 1 depicts a distributed processing system.

As indicated, FIG. 1 schematically illustrates a distributed processing system incorporating a preferred embodiment of the present invention. In the system of FIG. 1, host computer 10 has a very large main memory 11 and several large secondary storage devices such as disc drives 12.

Terminals 20 have limited screen storage and enough processing capability to perform certain screen editing control, communications, and keyboard processing. Typically, the screen storage capability of terminal 20, also referred to as a "page," is 240 lines of text. The terminal, however, can only display a portion of a page at any one time. The displayed portion is defined as a "window." Typically, the window size may be 23 lines of text.

Figure 2A:
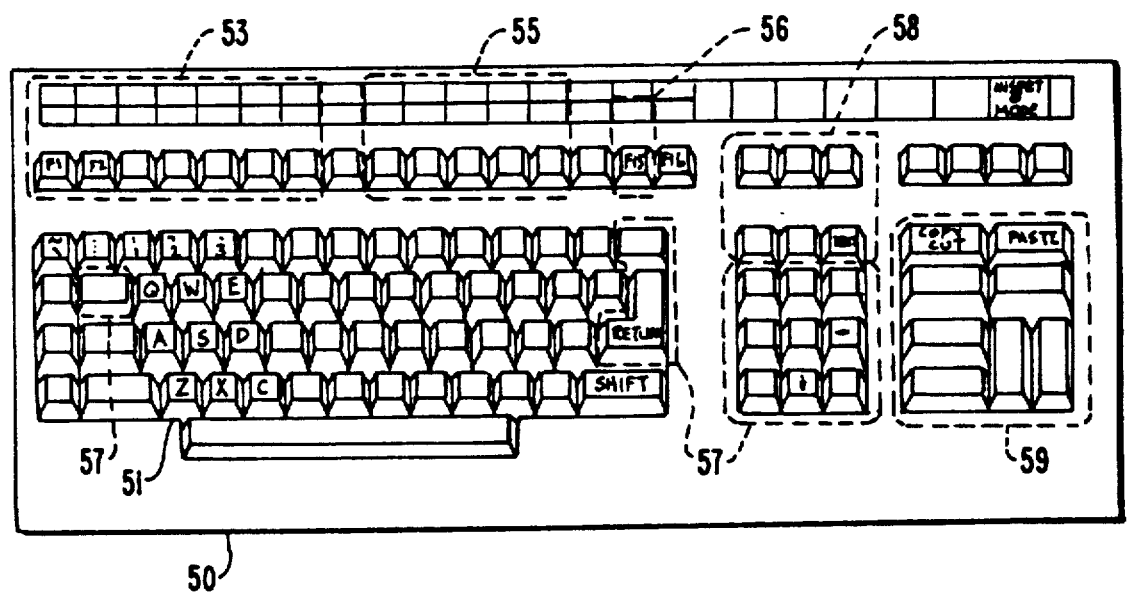
FIG. 2a depicts a keyboard for the text processing method and system of this invention.

The keyboard 50 of terminal 20 is shown in detail in FIG. 2a. Keyboard 50 includes an ASCII character set 51, object selection keys 53, text positioning and attribute keys 55, special formatting keys 56, basic editing and cursor positioning keys 57, text scrolling and paging keys 58, and object manipulation special function keys 59. The communication lines 30 between host 10 and terminals 20 are hard-wired lines or conventional telephone links.

To take advantage of the beneficial features of both the host computer and the terminals with this invention, the following four fundamental operations or "primitives" are defined in accordance with this invention for text processing: insertion, deletion, replacement and window movement.

Insertion involves the addition of characters (including spaces) to text. Insertion can range from the addition of a letter to a word in the middle of a text, as well as the entry of an entire document.

Deletion involves removal of characters from text. For example, deletion of the second "s" in "dessert" leaves "desert." The net effect of deletion is fewer characters.

Replacement differs from deletion since there is no net loss of characters. There is instead an exchange of one character for another. For example, to change "heed" into "heel" the "d" would be replaced with an "l".

The window movement primitive is slightly different from the other three primitives in that it does not involve text alteration. Since all that can be seen of a document at any one time is a "window," to view different parts of a document, the location of the window must be changed. This operation is called window movement.

Each of these primitives corresponds to a different audit type. The audit messages which can be one of the four audit types provide many of the advantages of the present invention. For these primitive operations, the terminals perform the indicated operation locally and then form a compacted message which they send to the host when one of a variety of conditions discussed in detail below occurs. This act of sending the audit messages is called "transmitting the current audit message." This invention allows the entire distributed processing system to provide fast response times at the terminal and by constantly, and largely asynchronously, updating the host computer process files, maintains the integrity of the data at a high level.

Figure 2B:
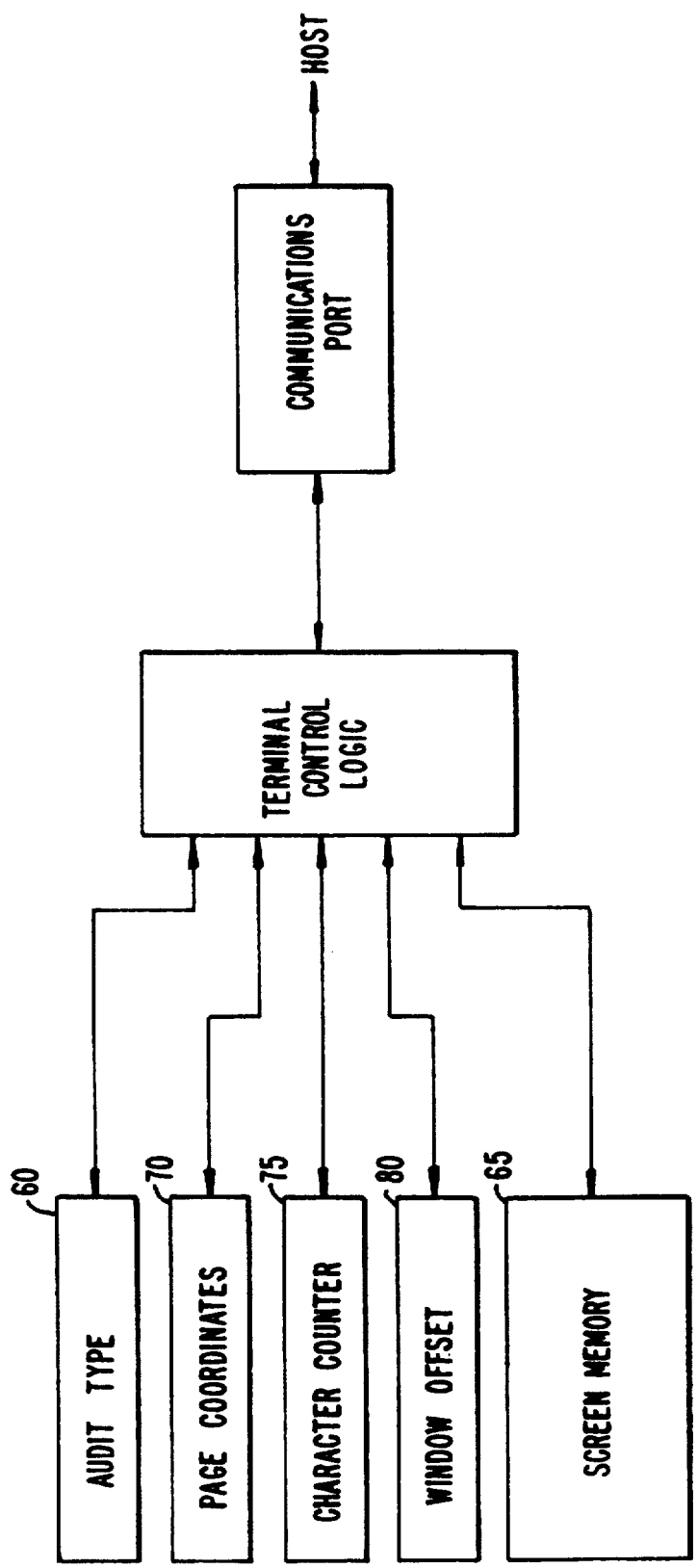
FIG. 2b shows portions of the circuitry of the terminals shown in FIG. 1.

The compacted information, transmitted when the audit message is transmitted depends on the audit type. For an insertion audit type, the audit message includes information identifying the message as an insertion audit type. In a preferred embodiment of the terminal storage and control shown in FIG. 2b, the audit type is stored in a designated section of storage 60 which can be a separate register or a designated location in screen memory 65.

The insertion type audit message also includes the page coordinates of the first and last locations of the text to be inserted and the text to be inserted. The page coordinates are the row and column of the entire page as stored in the terminal's memory. The page coordinates, which for the preferred embodiment include designations of row and beginning and ending columns, are stored in a designated storage section 70 which could also be a separate register or a designated location in screen memory 65. The text to be inserted is contained in screen memory and can be located by the screen coordinates.

A replacement audit message is similar to an insertion audit type message, except the replacement audit message contains a different code in audit type storage 60.

Since the page coordinates for insertion and replacement audit messages identify only one row, the terminal transmits its current audit message when the material to be inserted or replaced requires a row change. This avoids any ambiguity in the length of the insertion. Of course, the terminal could store different or additional information, for example, beginning and ending row information, to allow longer insertions or replacements before audit message transmission.

For delete audit type messages, the delete audit type information and page coordinate information is also stored in storages 60 and 70 (FIG. 2b) respectively. The remainder of the information in a delete audit type message is the number of characters to be deleted which is indicated by a counter 75. As with storages 60 and 70, counter 75 can be separate or part of screen memory 65.

A window movement audit type message includes only an indication of that audit type as stored in storage 60 and an absolute window offset stored in window offset storage 80, which also can be separate or part of screen memory. The absolute window offset indicates the location of the window relative to the terminal's page and is changed when the operator either requests a different window or takes an action which requires display of a new window. Normal window movement is commonly called scrolling.

The terminals also have states or modes which cause the terminal to react in a certain way to a particular input. The two modes of importance to this invention are the INSERT mode and the REPLACE mode.

The audit types in the preferred embodiment are limited to these four, i.e., insert, replace, delete, and window movement. There are other commands in the preferred embodiment of the text processing system of the invention. For example, certain commands are called short commands and are executed and sent to the host computer virtually simultaneously. Certain other commands require the memory and processing capability of the host computer and are executed completely by the host computer.

Of course, the set of primitives or audit types desired in a particular text processing situation can change.

Furthermore, in non-text processing applications, like distributed processing for file management, there may be a different set of primitives.

FIGS. 3–8 illustrate the flow logic of a preferred embodiment of a text processing system and method of this invention. The functions implemented by the flow logic may be controlled, for example, by a program resident at the terminal unit.

Figure 3:
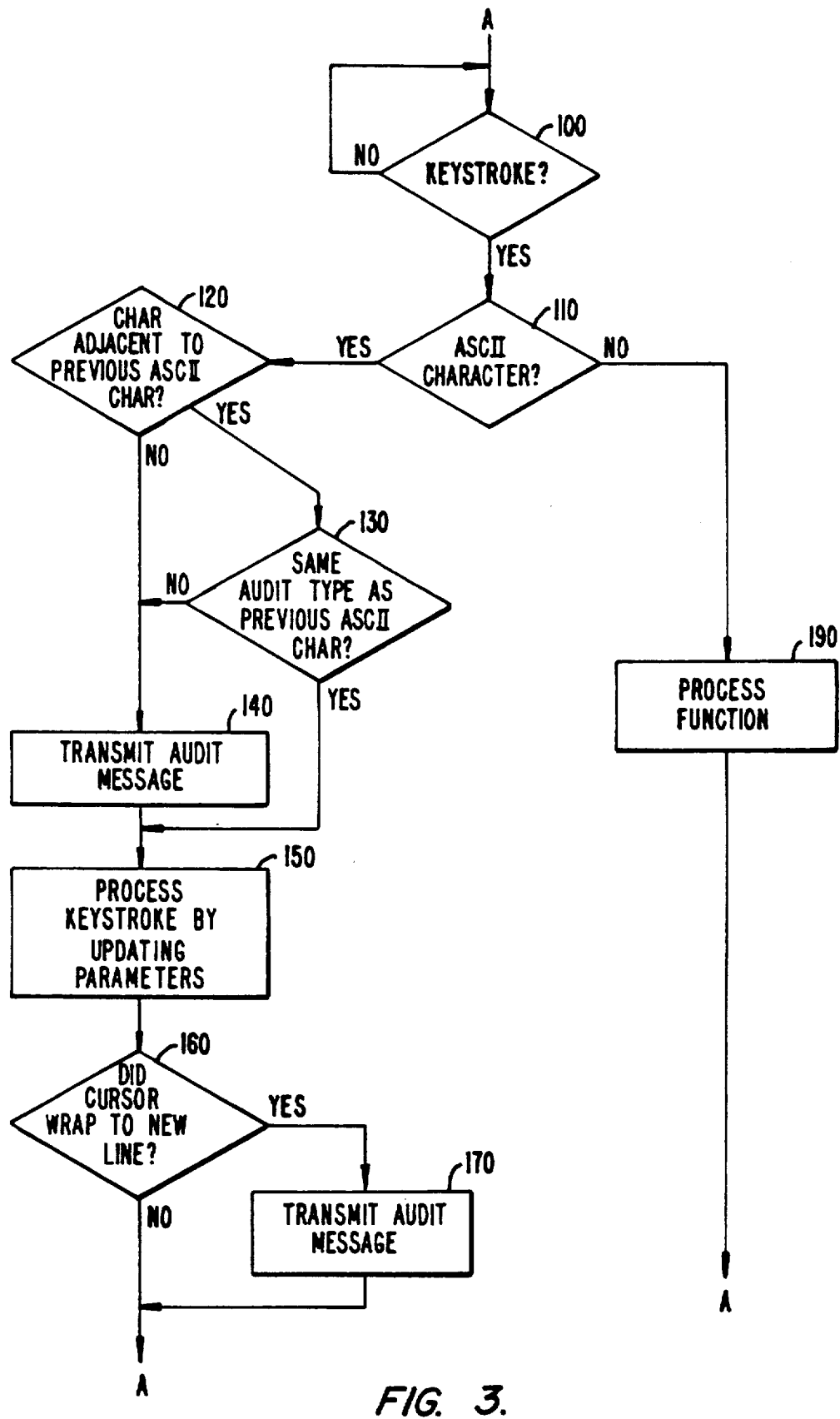
FIG. 3 shows a general logic flow diagram implemented, for example by a computer program, for processing key stroke inputs at the terminal according to this invention.

Referring to FIG. 3, when a keystroke is detected, step 100, the terminal determines whether that keystroke represents an ASCII character (step 110). If the keystroke does represent an ASCII character, then the terminal determines in step 120 whether the new character was adjacent in the text to the previous ASCII character received. If this test is also positive, then the terminal's next determination is whether the character just received has the same audit type as the previous character. This takes place in step 130.

The audit types of the character are those described above: insertion, deletion, replacement or window movement. The audit type of two adjacent characters could differ if, for example, between two successive ASCII character keystrokes, some action, like striking a function key, was taken to change the audit type.

If the audit types of two adjacent ASCII characters differ or if the character just received is not adjacent to the previous ASCII character, then the terminal transmits the audit message in step 140.

In the case of a negative answer from step 130, the audit message is transmitted because of a change in audit type. In the case of a negative answer from step 120, the audit message is transmitted because the newly-entered character is part of a different message.

Figure 4:
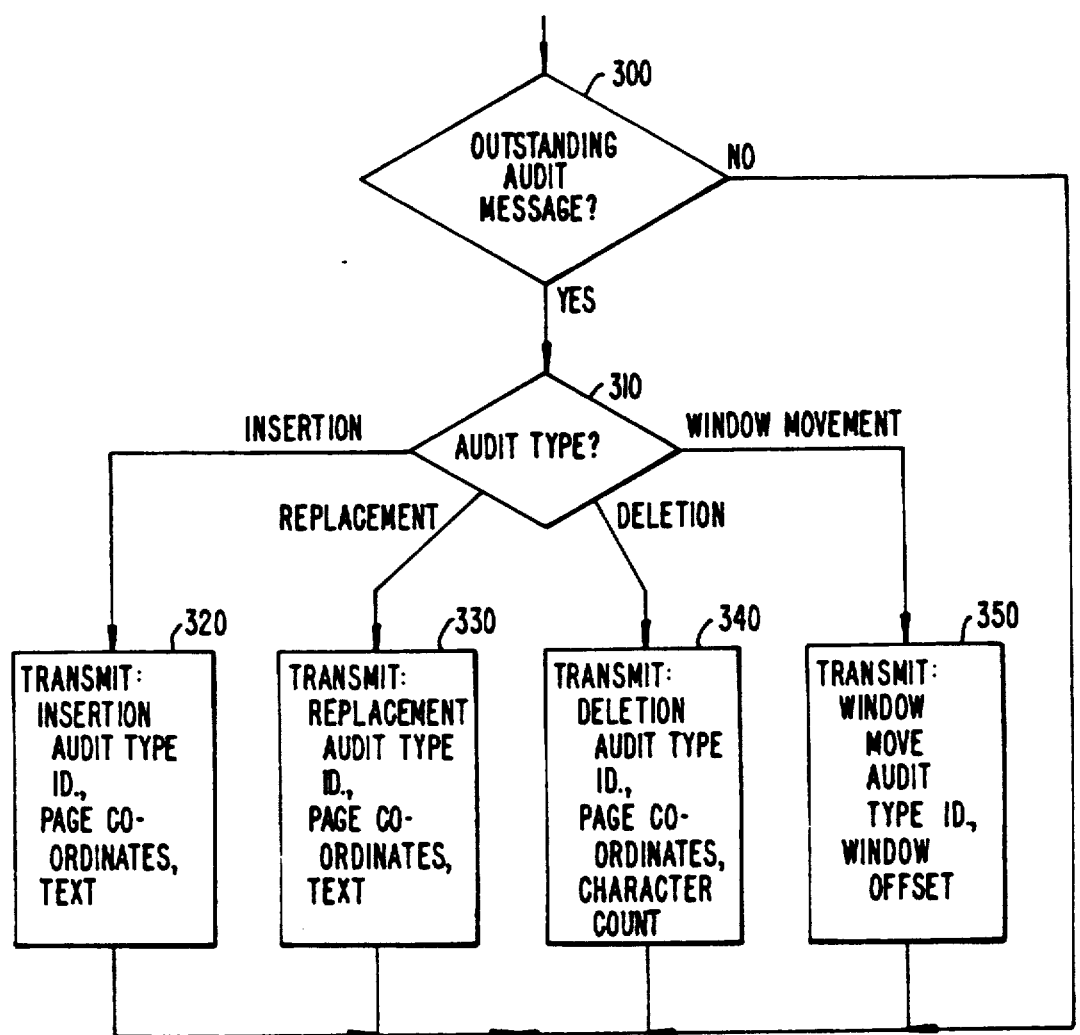
FIG. 4 shows the program operations for flushing the audit buffer in accordance with the present invention.

The steps for transmitting the audit message are shown in detail in FIG. 4. As shown in step 300, the terminal first checks to see whether there is an audit message to send, and if not, it takes no action. If there is an audit message, the terminal determines the audit type of the message in step 310 and takes the action generally described above.

Specifically, if the audit type is insertion, then in step 320, the terminal transmits to the host an identifier uniquely indicating an insert audit type, the page coordinates of the insertion, and the actual text to be inserted. As previously explained, the audit type is stored in storage 60, the page coordinates are stored in storage 70, and the text to be inserted is taken from screen memory 65.

If the audit type is replacement, then in step 330, the terminal transmits an identifier uniquely indicating a replacement audit type, the page coordinates of the first character to be replaced, and the actual text which is to replace the previous data. As with the insertion audit type, the audit type information comes from storage 60, the page coordinate information comes from storage 70, and the replacement text comes from screen memory 65.

If, in step 310, the terminal determined that the audit type was deletion, then in step 340, the terminal transmits an identifier uniquely indicating a deletion audit type, the page coordinates of the point at which the characters are to be deleted, and the actual number of characters to delete at this point. The audit type and page coordinates come from storage 60 and 70, respectively, and the number of characters to delete comes from character counter 75.

If the audit type is window movement, the terminal in step 350 again transmits an identifier uniquely indicating a window movement audit type and also transmits a new window position expressed as a relative offset from the top of the terminal page. That offset is contained in storage 80.

Figure 5:
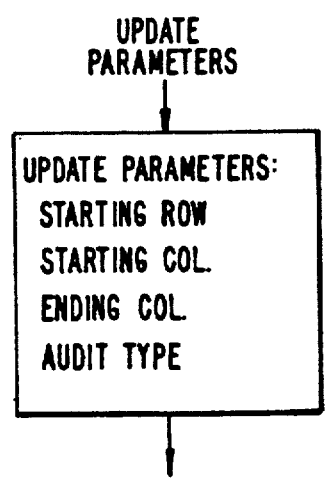
FIG. 5 shows the step of updating parameters in accordance with the present invention.

Referring again to FIG. 3, after transmitting the audit message in step 140, or if in step 130 it was determined that the ASCII character is both adjacent to and of the same type as the previous ASCII character, then the keystroke is processed by updating parameters in step 150. FIG. 5 shows the parameter update operation. If a character is adjacent to and of the same type as the previously entered ASCII character, then the updating consists merely of changing the ending column identified. If, however, the audit message has just been transmitted, then new parameters must be stored for the present keystroke.

After keystroke processing, the terminal checks in step 160 (FIG. 3) to see whether the cursor wrapped around to a new line. Cursor wrap-around occurs when the addition of a new character forces the text on one line into the righthand margin. To maintain proper margins the terminal automatically wraps around by taking the last word on the present row and moving it to the lefthand margin of the succeeding row. If this occurs, then the new character is placed on a different row from which it was entered thereby causing the terminal to transmit the audit message in step 170. If the cursor did not wrap around, or if it did and the audit message has been transmitted, then the terminal returns to entry point A and waits for the next keystroke.

If in step 110 the terminal determined that the keystroke was not an ASCII character, then the function represented by the struck key is processed in step 190.

Figure 6:
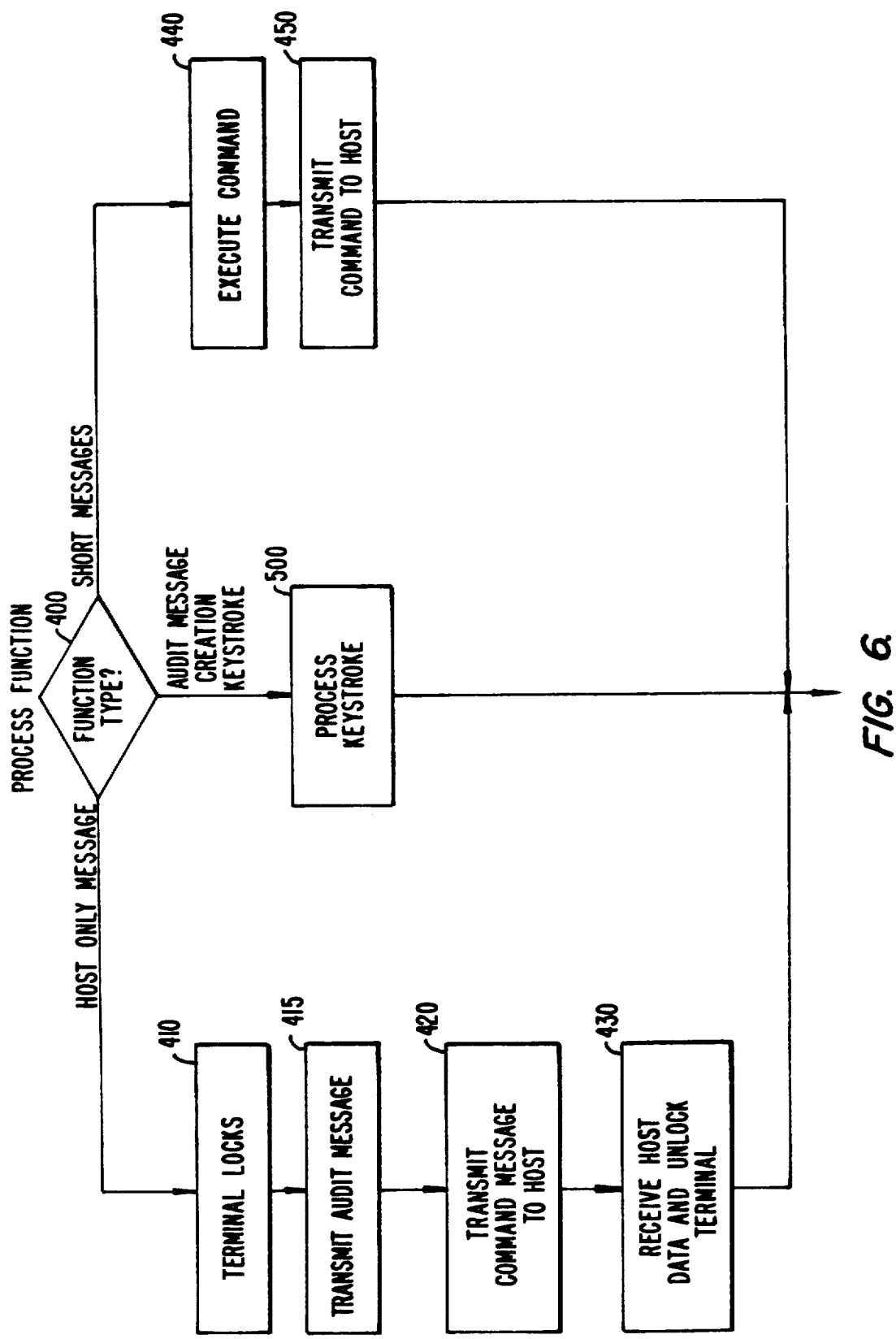
FIG. 6 shows the subroutine of function processing shown in FIG. 3.

FIG. 6 shows the process function in step 190 in greater detail. The first step, step 400, determines what type of function is represented by the keystroke. One type of function is called a "HOST ONLY" function because the operation called for is performed by the host computer. HOST ONLY functions include GO TO BEGINNING OF DOCUMENT and GO TO END OF DOCUMENT because these functions will often call for the text portions which are not stored in the current terminal page but are only stored at the host computer. Similarly, a command such as FIND which asks for the computer to locate a word or phrase in a text, and REPLACE which asks to locate a word or phrase and replace it with another word or phrase are HOST ONLY functions since the terminal may not have all the text needed for such a search.

Another HOST ONLY function is the PASTE command. The PASTE command directs the processor to take a text portion previously identified and excised by a CUT command (described below) and to insert it at another location. The host processor stores the text portions excised in response to CUT commands, so it must perform the PASTE command.

The OPEN and CLOSE commands are also HOST ONLY functions. OPEN breaks open a row of text by moving the remainder of the row and all subsequent text down one row. CLOSE closes the text by removing blank portions.

The UNDO and REDO commands are two other HOST ONLY functions. Each UNDO command directs the processor to undo or counteract the effect of the previous word processing command. For example, if the previous command was the insertion of a word, the UNDO command causes the screen text to appear as it did before that insertion. Continual pressing of the UNDO keystroke would eventually cause the document to appear as it did before any changes were made.

The REDO command is similar to the UNDO command, but REDO adds back in the effect of the word processing function which the previous UNDO command counteracted. In this sense, it "undoes" the effect of the UNDO commands. Because both the UNDO and REDO commands must reference a file which contains a complete chronological list of all the word processing commands executed at the terminal, they must be performed by the host which has the storage capabilities for such files.

Other types of HOST ONLY functions are the END command which tells the processor that the user has finished a word processing session and the COMMAND function which provides menu selection. For example, the words or phrases for a FIND or REPLACE function are inputted using the menu selection from the COMMAND function.

The terminal treats all HOST ONLY functions the same. First, the terminal locks itself, step 410 (FIG. 6), and then the terminal transmits any outstanding audit messages, step 415. The terminal then transmits an identifier uniquely indicating the desired function and the current coordinates expressed as absolute page coordinates to the host at step 420. When the host computer finishes processing the function, it sends back to the terminal whatever data is required by the function and tells the terminal to unlock. The terminal in step 430 receives that data, which could be a new screen for example, and unlocks itself.

One effect of the HOST ONLY command is resynchronizing the host computer and the terminal. When a HOST ONLY command is sent by the terminal to the host processor, the terminal locks its keyboard and transmits any outstanding audit message before transmitting the HOST ONLY command sequence and can receive no further commands or functions. Since the terminal unlocks only after that command is processed, the host processor, which runs asynchronously with the terminal, is now at the same processing point as the terminal.

Figure 8:
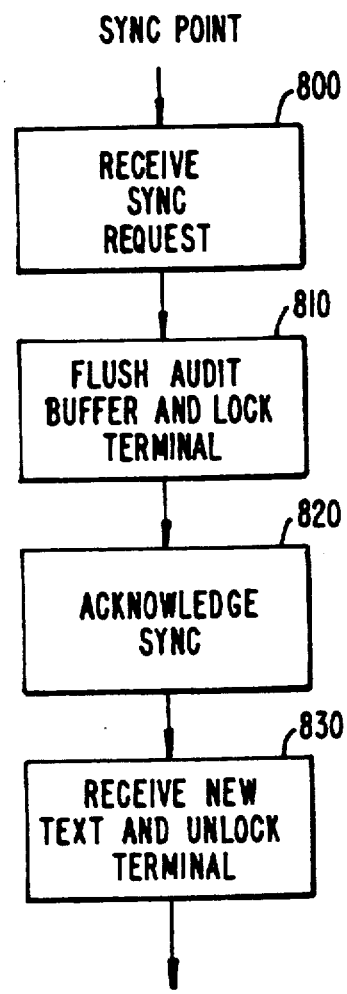
FIG. 8 shows the operation of SYNC point implemented in accordance with the present invention.

Another form of synchronization is discussed in greater detail in connection with the SYNC point operation illustrated in FIG. 8.

Another function type is the SHORT MESSAGE. Many SHORT MESSAGES involve an "object" which the user identifies by keyboard entry as either a character or string of characters, a word, a sentence, a paragraph, a line, or a box. A box is a rectangular portion of the screen which is defined by its two opposite corners. The current object is identified by the cursor position. Thus, if the user has selected the object to be a paragraph, the current object is whatever paragraph contains the cursor position regardless of where in that paragraph the cursor appears.

The messages involving an object include SELECT OBJECT (i.e., character, word, sentence, line, paragraph or block), DELETE OBJECT, ERASE OBJECT (which differs from delete object in that it replaces the deleted object with blanks), NEXT and PREVIOUS OBJECT and BOLD (which makes the object appear in bold type) and UNDERSCORE OBJECT (which makes the object appear underlined). These messages were not delivered as audit messages in this embodiment because their abbreviated form means that the terminal need not transmit text and character counts. They could, however, have been defined as another type of audit message.

Other SHORT MESSAGES involve text formatting, for example, DELETE LINE, ERASE TO END OF LINE, ERASE TO END OF PAGE, and CENTER (which centers a word or phrase in the middle of a page). Although these functions could have been formulated as audit messages, the present embodiment functions to make these SHORT MESSAGES.

Other SHORT MESSAGES are CANCEL, CUT and COPY. CANCEL tells the processor to cancel the current object selection. CUT tells the processor to remove the indicated text portion and store it for a later PASTE command, and COPY instructs the processor to duplicate an indicated portion of the text and insert it at the new indicated location. The CUT and COPY commands cause the terminal and the host processor to perform different actions. The terminal treats the CUT command as a deletion, whereas the host processor treats the CUT command not only by deleting the identified portion but it also stores it in a special file. The terminal treats the COPY command as an OBJECT CANCEL, whereas the host processor stores the identified portion in a specified file.

In processing SHORT MESSAGES, the terminal first executes the functions identified by the message, step 440 (FIG. 6), and then transmits the command to the host processor for execution. Execution by the host processor is asynchronous with the terminal's execution.

Other keystrokes result in neither a HOST ONLY function nor a SHORT MESSAGE. These keystrokes, called audit message creation keys, can result in the transmission of the current audit message and/or the start of a new audit message. As has been explained previously, audit message transmission and creation may also occur as a result of other actions taken by the terminal. If an audit message creation key is detected, then processing occurs in step 500. The features of step 500 are shown in detail in FIG. 7.

Figure 7:
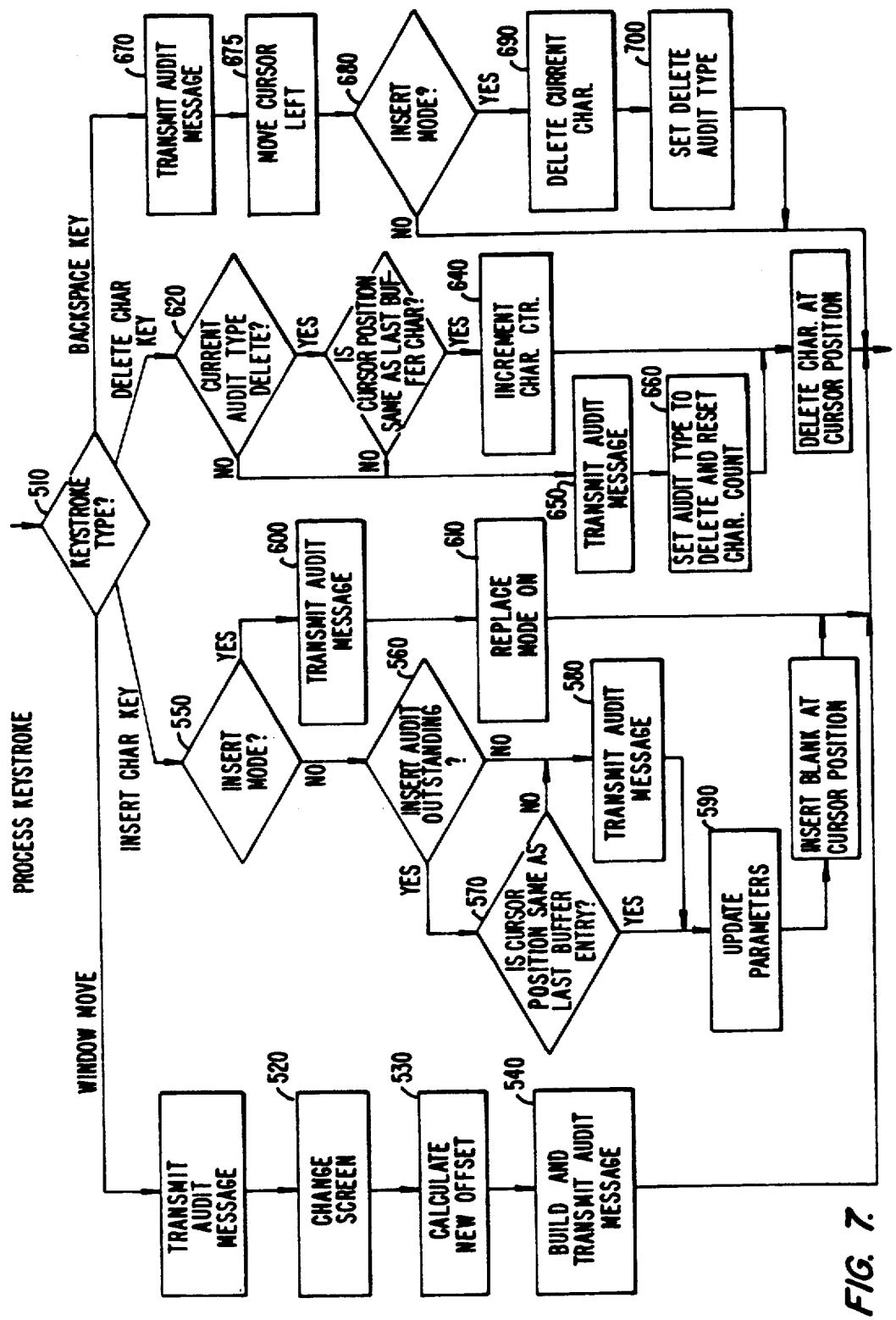
FIG. 7 shows the operation of processing current messages shown in FIG. 5.

Step 510 in FIG. 7 determines the type of keystroke. Keys which cause window movement, including ROLL UP and ROLL DOWN, transmit any outstanding audit message (step 515), change the screen (step 520), calculate the new window offset (step 530) and then build and transmit the new window movement audit message (step 540).

A WINDOW MOVEMENT message can also be generated if the terminal takes actions which cause the window to change, for example, if the user tries to move the cursor down while the cursor is on the bottom row.

If the user presses an INSERT CHAR key, terminal determines whether the terminal presently is in the INSERT mode (step 550). As indicated above, the terminal modes INSERT and REPLACE are not the same as the audit types of similar designation. The terminal modes affect the actions which the terminal will take in response to certain inputs.

If the terminal is in the INSERT mode, the terminal transmits the current audit message, step 600, and then turns on the REPLACE mode which changes the terminal's mode or state.

If the INSERT mode was not on, then in step 560 the terminal checks to see whether there is a current insert type audit message outstanding. The reason for the determination in step 560 is that a previous operation may have caused a wraparound and there could be an outstanding insert audit.

If there is an outstanding insert audit, then in step 570, the terminal determines whether the cursor position is at the location of the position indicated in the outstanding audit message. If not, or if there is no outstanding insert audit, the terminal transmits the audit message, step 580, and updates the parameters in step 590. This update is as shown in FIG. 5 and would require new entries for a new audit message. If the cursor position is the same as the position indicated in the outstanding audit message, then the terminal merely updates the parameters in step 590 and inserts a blank space at the cursor position in step 595.

If the DELETE CHAR key is struck, then, as indicated in step 620, the current audit type is checked to see if it is deletion. If so, the terminal determines whether the current cursor position is the same as the position indicated in the outstanding audit message. If so, in step 640, the terminal increments the character counter. If not or if the audit type is not deletion, the terminal transmits the current audit message, step 650, and in step 660 changes the audit type to deletion and resets the character counter to one (1). In step 665, the terminal deletes the character at the cursor position.

Another keystroke that may generate an audit message can be from the BACKSPACE key. Upon detecting the BACKSPACE keystroke, the terminal transmits the current audit message in step 670, moves the cursor one position to the left, step 675, and then determines whether the terminal is in the INSERT mode, step 680. If the terminal is in the INSERT mode, then pressing the BACKSPACE key deletes the characters at the new screen cursor position. The terminal then sets the audit type to deletion in step 700 to build a delete audit message. If the terminal is not in the INSERT mode, then the effect of the backspace is merely to move the cursor left.

Referring again to FIG. 3, after the process function step 190 is executed, the terminal returns to state A to wait for the next keystroke.

As alluded to above, a condition of the distributed processing system and method of this invention is the periodic asynchronous operation of the terminal and host processor. This requires special precautions to prevent undesirable effects. If, for example, the terminal window is at one end of the stored page, while the host processor is editing portions at the other end of the page, the host processor may decide to change the page at the terminal, which could remove the lines being viewed by the terminal operator.

To avoid this, the host processor attempts to keep the terminal window in the middle of the terminal page. As the terminal window moves, the host processor may change the page stored at the terminal. If the changes to the terminal page were to be made asynchronous to terminal operation, then the host would have no means of determining whether subsequent audit messages occurred before, after or during the update of the terminal page. To synchronize host and terminal operation before the terminal page is changed, the host processor effects a SYNC point operation. The SYNC point logic is shown diagrammatically in FIG. 8. In this routine, the terminal at step 800 receives a SYNC REQ (synchronization request) signal from the host processor. In response, the terminal at step 810 transmits the current audit message and locks the terminal. It then, at step 820, sends a signal to the host acknowledging the SYNC REQ.

The host processor executes all the editing commands and messages which the terminal has previously sent, recenters the terminal page and window, sends any new text to the terminal, and indicates that the terminal may unlock. At step 830, the terminal receives the new text and unlocks itself.

It will be apparent to those skilled in the art that various modifications and variations can be made to the distributed processing and text processing methods and devices of this invention. For example, different primitives can be defined and the definition and classification of commands can, of course, be changed. The present invention is not limited to the specific details, representative methods and apparatus and illustrative examples described and departure from such details does not necessarily entail departures from the general inventive concept.

What is claimed is:

1. A method for operating a word processing system having a host computer including a central memory unit for storing text data; a terminal unit having a local memory, a display device for displaying a page of text data stored in said local memory, the page of text data having page coordinates, and a keyboard for receiving operator inputs; and means for transferring data between said host computer and said terminal unit, said method comprising the steps of:

transferring a portion of said text data from said host computer central memory unit to said terminal unit local memory;

generating text editing inputs to alter said text data in said local memory;

assembling at said terminal unit, for selected text editing inputs, audit messages having an identifier indicating a fundamental operation of said selected inputs and containing information necessary for said host computer to effect said operation requested by said inputs;

providing in said audit message data indicating page coordinates of the text data altered by said text editing inputs;

altering said text data in said local memory by effecting the operations requested by said preselected inputs; and transferring said audit messages to said host computer as said text editing inputs are being generated to alter said text data stored in said central memory unit by effecting the operations requested by said preselected text editing inputs.

2. The method set forth in claim 1 further comprising the step of:

providing in said audit message data indicating the page coordinates of the first item of text data altered by said text editing inputs.

3. The method set forth in claim 2 comprising the further step of:

providing in said audit message an identifier indicating that said message represents a text data insert operation.

4. The method set forth in claim 2 comprising the further step of:

providing in said audit message an identifier indicating that said message represents a text data replacement operation.

5. The method set forth in claim 2 comprising the further step of:

providing in said audit message data identifying new text data added to said local memory by said data editing inputs.

6. The method set forth in claim 1 further comprising the step of:

providing in said audit message data indicating the page coordinates of the last item of text data altered by said text editing inputs.

7. The method set forth in claim 6 comprising the further step of:

providing in said audit message an identifier indicating that said message represents a text data insert operation.

8. The method set forth in claim 6 comprising the further step of:

providing in said audit message an identifier indicating that said message represents a text data replacement operation.

9. The method set forth in claim 6 comprising the further step of:

providing in said audit message data identifying new text data added to said local memory by said data editing inputs.

10. The method set forth in claim 1 comprising the further step of:

providing in said audit message an identifier indicating that said message represents a text data insert operation.

11. The method set forth in claim 10 comprising the further step of:

providing in said audit message data identifying new text data added to said local memory by said data editing inputs.

12. The method set forth in claim 1 comprising the further step of:

providing in said audit message an identifier indicating that said message represents a text data replacement operation.

13. The method set forth in claim 12 comprising the further step of:

providing in said audit message data identifying new text data added to said local memory by said data editing inputs.

14. The method set forth in claim 1 comprising the further step of:

providing in said audit message data identifying new text data added to said local memory by said data editing inputs.

15. The method set forth in claim 1 further comprising the step of:

providing in said audit message an identifier indicating that said message represents a text data delete operation.

16. The method set forth in claim 1 further comprising the further steps of:

providing in said audit message an identifier indicating that said message represents a text data insert operation; and providing in said audit message data identifying only new text data added to said local memory by said text editing inputs.

17. The method set forth in claim 1 further comprising the further steps of:

providing in said audit message an identifier indicating that said message represents a text data replacement operation; and providing in said audit message data identifying only new text data added to said local memory by said text editing inputs.

18. A method for operating a word processing system having a host computer including a central memory unit for storing text data; a terminal unit having a local memory, a display device for displaying a page of text data stored in said local memory, the page of text data having page coordinates, and a keyboard for receiving operator inputs; and means for transferring data between said host computer and said terminal unit, said method comprising the steps of:

transferring a portion of said text data from said host computer central memory unit to said terminal unit local memory;

generating text editing inputs to alter said text data in said local memory;

assembling at said terminal unit, for selected text editing inputs, audit messages having an identifier indicating a fundamental operation of said selected inputs and containing information necessary for said host computer to effect said operation requested by said inputs;

providing in said audit message an identifier indicating that said message represents a text data delete operation;

providing in said audit message data indicating the page coordinates of said text data item to be deleted;

altering said text data in said local memory by effecting the operations requested by said preselected inputs; and transferring said audit messages to said host computer as said text editing inputs are being generated to alter said text data stored in said central memory unit by effecting the operations requested by said preselected text editing inputs.

19. A method for operating a word processing system having a host computer including a central memory unit for storing text data, a terminal unit having a local memory, a display device and a keyboard for receiving operator inputs, and means for transferring data between said host computer and said terminal unit, said method comprising the steps of:

transferring a portion of said text data from said host processor central memory unit to said terminal unit local memory;

displaying on said display device a portion of said text data stored in said local memory;

generating text editing inputs to alter said text data in said local memory;

assembling at said terminal unit an audit message indicating the portion of text data which is being displayed on said display device;

transferring said audit message to said host computer as said text editing inputs are generated; and transferring new text data from said host processor central memory unit to said terminal unit local memory in response to receipt by said host computer of said transferred audit message.

20. A method for operating a word processing system having a host computer including a central memory unit for storing text data; a terminal unit having a local memory, a display device for displaying a page of text data stored in said local memory, the page of text data having page coordinates, and a keyboard for receiving operator inputs; and means for transferring data between said host computer and said terminal unit, said method comprising the steps of:

transferring a portion of said text data from said host computer central memory unit to said terminal unit local memory;

generating text editing inputs to alter said text data in said local memory;

assembling at said terminal unit, for selected text editing inputs, audit messages having an identifier indicating a fundamental operation of said selected inputs and containing information necessary for said host computer to effect said operation requested by said inputs;

providing in said audit message an identifier indicating that said message represents a text data delete operation;

providing in said audit message data indicating the number of text data items to be deleted;

altering said text data in said local memory by effecting the operations requested by said preselected inputs; and transferring said audit messages to said host computer as said text editing inputs are being generated to alter said text data stored in said central memory unit by effecting the operations requested by said preselected text editing inputs.

21. A method for operating a word processing system having a host computer including a central memory unit for storing text data, a terminal unit having a local memory and a keyboard for receiving operator inputs, and means for transferring data between said host computer and said terminal unit, said method comprising the steps of:

transferring a portion of said text data from said host computer central memory unit to said terminal unit local memory;

generating text editing inputs to alter said text data in said local memory;

assembling at said terminal unit, for selected text editing inputs, audit messages having an identifier indicating one of a plurality of fundamental operation of said selected inputs and containing information necessary for said host computer to effect said operation requested by said inputs;

altering said text data in said local memory by effecting the operations requested by said preselected inputs; and transferring said audit message to said host computer when said fundamental operation of said selected inputs changes to alter said text data stored in said central memory unit by effecting the operations requested by said preselected text editing inputs.

22. A method for operating a word processing system having a host computer including a central memory unit for storing text data, a terminal unit having a local memory and a keyboard for receiving operator inputs, and means for transferring data between said host computer and said terminal unit, said method comprising the steps of:

transferring a portion of said text data from said host computer central memory unit to said terminal unit local memory;

generating text editing inputs to alter said text data in said local memory;

assembling at said terminal unit, for selected text editing inputs, audit messages having an identifier indicating a fundamental operation of said selected inputs and containing information necessary for said host computer to effect said operation requested by said inputs;

providing in said audit message data identifying new text data added to said local memory by said data editing inputs;

altering said text data in said local memory by effecting the operations requested by said preselected inputs; and transferring said audit messages to said host computer as keystrokes for entering information into said audit messages occur to alter said text data stored in said central memory unit by effecting the operations requested by said preselected text editing inputs.

23. A method for operating a word processing system having a host computer including a central memory unit for storing text data, a terminal unit having a local memory and a keyboard for receiving operator inputs, and means for transferring data between said host computer and said terminal unit, said method comprising the steps of:

transferring a portion of said text data from said host computer central memory unit to said terminal unit local memory;

generating text editing inputs to alter said text data in said local memory;

assembling at said terminal unit, for selected text editing inputs, audit messages having an identifier indicating a fundamental operation of said selected inputs and containing information necessary for said host computer to effect said operation requested by said inputs;

providing in said audit message data identifying new text data added to said local memory by said data editing inputs;

altering said text data in said local memory by effecting the operations requested by said preselected inputs; and transferring said audit message to said host computer when a text datum added to said local memory is not adjacent in said local memory to an immediately preceding text datum added to said local memory.

* * * * *